United States Patent [19] [11] 4,371,835
Kago et al. [45] Feb. 1, 1983

[54] RPM DETECTION SYSTEM FOR INTERNAL COMBUSTION ENGINE

[75] Inventors: Yoshiyuki Kago; Sigeyuki Akita, both of Okazaki; Katsuhisa Fujikawa, Toyota, all of Japan

[73] Assignee: Nippon Soken, Inc., Nishio, Japan

[21] Appl. No.: 191,682

[22] Filed: Sep. 29, 1980

[30] Foreign Application Priority Data

Oct. 2, 1979 [JP] Japan .................. 54-136884[U]

[51] Int. Cl.³ .................................................. G01P 3/48
[52] U.S. Cl. ...................................... 324/174; 73/116
[58] Field of Search ............... 324/174, 169, 168, 392; 73/117.3, 116; 364/551

[56] References Cited

U.S. PATENT DOCUMENTS 4,266,192 5/1981 Ohtani ........................... 324/174 X
4,292,670 9/1981 Reid et al. ..................... 364/551 X

*Primary Examiner*—Stanley T. Krawczewicz
*Attorney, Agent, or Firm*—Cushman, Darby & Cushman

[57] ABSTRACT

An internal combustion engine rpm detection system, which detects the rpm of an automotive internal combustion engine, comprises a magnetic sensor section for forcibly magnetizing a valve rocker arm in the neighborhood of an oil inlet formed in a cylinder head cover of the internal combustion engine and for detecting the magnetic field changes in the valve rocker arm accompanying the motion thereof. A processing section supplies a drive signal to said magnetic sensor section and converts the output of said magnetic sensor section representing magnetic field changes accompanying the rocking motion of the valve rocker arm into a pulse signal. The magnetic sensor section and processing section are removably mounted as an integral unit in the oil inlet of the engine.

8 Claims, 7 Drawing Figures

RPM DETECTION SYSTEM FOR INTERNAL COMBUSTION ENGINE

BACKGROUND OF THE INVENTION

1. Field of the Invention

This invention relates to rpm detection systems for detecting the number of revolutions or rpm of automotive internal combustion engines and, more particularly, to an rpm detection system suited for the detection of the rpm of diesel engines.

2. Description of the Prior Art

The prior-art diesel engine rpm detection systems include one in which the engine rpm is detected through the detection of a pressure change at the time of fuel injection into the cylinder with a piezoelectric element or the like mounted on a fuel injection pump, and one in which the rpm detection is obtained through the detection of the reciprocating movement of the plunger of a metering pump provided within a fuel injection pump with a differential transformer.

However, the former system is greatly influenced by the fuel injection pressure in the diesel engine, and is prone to malfunction in a low engine rpm region in which the fuel injection pressure is low. Additionally, there is a fatal problem in that at the time when the fuel is cut, at which time no pressure change is produced in the pipe, the engine rpm cannot be detected.

Further, both the former and latter systems have a difficiency in that they can be applied only to diesel engines. Furthermore, with the latter system, sufficient performance cannot be obtained in the case where the system is installed in a separate place, for instance in an oil filler cap as according to the invention, unless its distance from the rocker arm is sufficiently small.

In an automotive engine, for instance a diesel engine as shown in FIGS. 1a and 1b which show the cylinder head in elevational and side sectional views, respectively, within an engine casing there is seen at least one valve rocker arm 13 when the interior of the engine casing is looked at through an oil inlet (a threaded hole) 11' provided in a cylinder head cover 11 by removing an oil filler cap 12 therefrom, the valve rocker arm 13 being oscillated according to the rotation of the engine crankshaft. This situation is found in almost all types of engines. In FIG. 1, designated at 14 is a cylinder head, and at 15 intake and exhaust valves which move vertically with the rocking motion of respective valve rocker arms 13.

SUMMARY OF THE PRESENT INVENTION

The primary object of the invention, accordingly, is to provide an internal combustion engine rpm detection system which comprises a magnetic sensor section provided in or in lieu of the afore-mentioned oil filler cap for magnetizing a valve operating member such as a valve rocker arm, which is made of cast iron or like magnetic material and is seen through the afore-mentioned oil inlet, and for detecting magnetic changes in the member. A processing section processes the output signal from the magnetic sensor section, thus permitting accurate detection of the engine rpm irrespective of the type of engine in a contact-free manner and even at a considerably large distance, and also which can be very simply installed.

Since according to the invention a magnetic sensor section for magnetizing a valve operating member such as a valve rocker arm or a cam located in the neighborhood of an oil inlet formed in a cylinder head cover and for detecting magnetic changes in that member and a processing section for processing the output signal from the magnetic sensor section are removably installed in the oil inlet in lieu of an oil filler cap, it is possible to obtain accurate detection of the engine rpm irrespective of the type of engine and in a noncontact manner and to also obtain very simple installation of the detection system.

BRIEF DESCRIPTION OF THE DRAWINGS

The present invention will be apparent from the following description taken in conjunction with the accompanying drawings, in which.

DESCRIPTION OF THE PREFERRED EMBODIMENT

Now the invention will be described with reference to an illustrated embodiment thereof.

Figure 2:
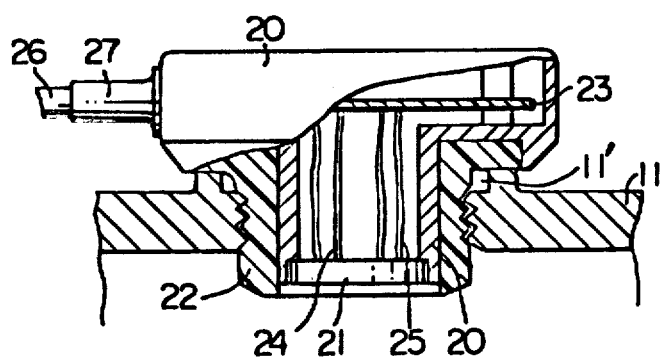
FIG. 2 is a fragmentary sectional view, partly in section, showing an embodiment of the detection system according to the invention.
Figure 3:
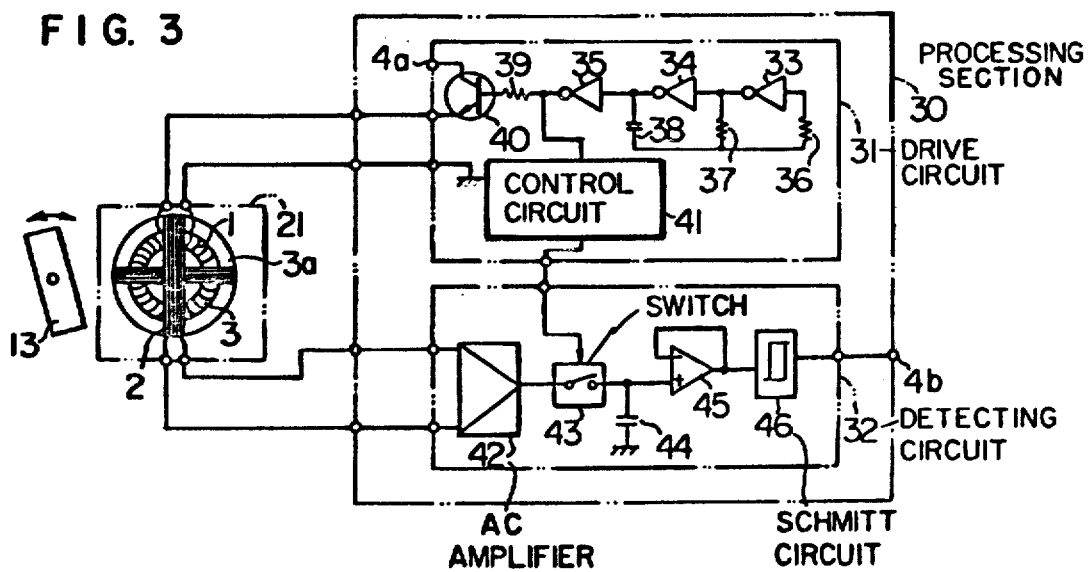
FIG. 3 is a circuit diagram showing the electric circuit of the embodiment of FIG. 2.

FIGS. 2 and 3 show an embodiment of the engine rpm detection system. It comprises a housing 20, a magnetic sensor section 21, a printed circuit board 23 carrying an electronic circuit constituting a processing section 30 (FIG. 3), leads 24 connecting the magnetic sensor section 21 and printed circuit board 23 for driving the magnetic sensor section 21, leads for coupling the output of the magnetic sensor section 21 to the processing section 30, a power supply line 26 for supplying power to the detection system, a protective rubber 27, and a cylindrical rubber 22 having an outer male thread for removably mounting the housing 20 in an oil inlet 11' in an engine cylinder head cover 11. The magnetic sensor section 21 and the printed circuit board 23 carrying the processing section 30 are made with each other when they are accommodated in the housing 20.

The magnetic sensor section 21 consists of a flux gate type magnetometer including a drive coil 1, a detection coil 2 and an annular permalloy core 3 on which the coils 1 and 2 are wound. The drive coil 1 is uniformly wound on the core 3, and the detection coil 2 is wound in X and Y axis directions on the drive coil 1 via an annular holder member 3a made of a non-magnetic material.

The processing section 30 includes a drive circuit 31 for driving the magnetic sensor section 21 and a detecting circuit 32 for detecting the output of the magnetic sensor section 21. Designated at 4a is a voltage supply terminal connected to a constant voltage circuit, and at 4b an output terminal.

The drive circuit 31 includes an astable multivibrator (i.e., oscillator) having inverters 33 and 34, resistors 36 and 37 and a capacitor 38, an inverter 35, a resistor 39, a transistor 40 and a control circuit 41 for driving an analog switch in the detecting circuit 32 under the control of the output of the multivibrator.

The detecting circuit 32 includes an AC amplifier 42, the analog switch 43, a capacitor 44, an operational amplifier 45 and a Schmitt circuit 46.

Figure 1A:
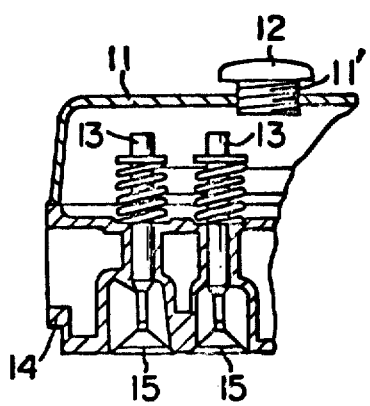
FIGS. 1a and 1b show in respective elevational and side sectional views a cylinder head of an internal combustion engine.
Figure 1B:
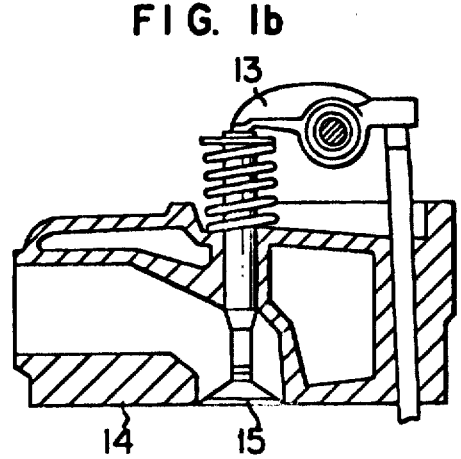

Of the valve rocker arms 13 (FIG. 1) which are made of cast iron or like magnetic material, only one that can be seen through the oil inlet 11' (i.e., the one nearest to the oil inlet 11') is magnetized.

Figure 6:
FIG. 6 is a fragmentary longitudinal sectional view showing an example of a jig for magnetization used in the embodiment of FIG. 2.

To this end, a jig or magnetizing member as shown in FIG. 6, consisting of a permanent magnet 61 and a grip member 62 which is capable of being bent like a flexible rule and secured at one end of which is one end of the permanent magnet 61, is inserted into the interior of the cylinder head cover 11 through the oil inlet 11' and held in contact with only the valve rocker arm 13 that can be seen through the oil inlet 11'. In this way, the aforementioned valve rocker arm 13 is magnetized by the magnetizing force of the permanent magnet 61.

Figure 4:
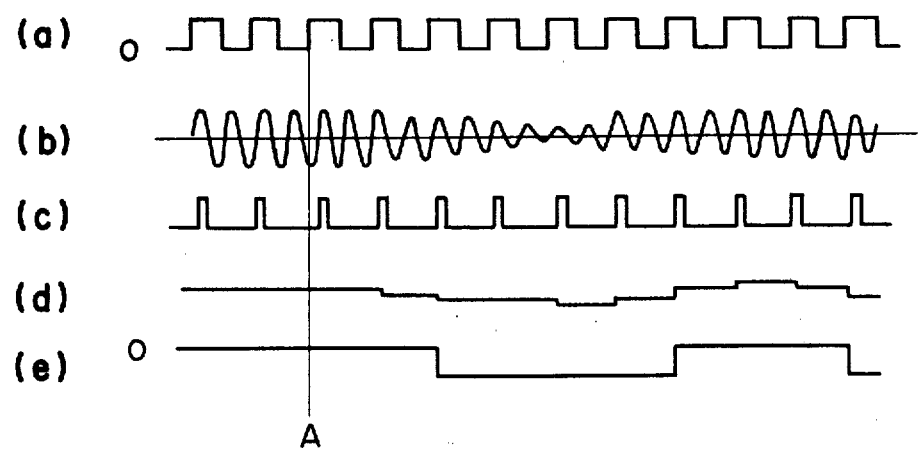
FIG. 4 is a waveform chart showing waveforms appearing at various parts of the embodiment of FIG. 2.

The operation of the above construction will now be described. The output (shown at (a) in FIG. 4) of the astable multivibrator constituted by the inverters 33 and 34, resistors 36 and 37 and the capacitor 38 is coupled through the transistor 40 to the drive coil 1 of the magnetic sensor section 21. With this signal, a large drive magnetic field is produced in the core 3. When a slight signal field is externally coupled in this state, a signal proportional to the combination of the drive field and signal field in superimposition to each other (as shown in (b) in FIG. 4) is produced in the detecting coil 2. The amplitude of this resultant combination signal is changed according to the amplitude of the signal field. More particularly, a signal, the amplitude of which is constant as the portion of the waveform in (b) in FIG. 4 on the left side of line A when the magnetized valve rocker arm 13 is stationary (i.e., when the engine is not rotated) but is modulated as in the portion of the waveform (b) in FIG. 4 on the right side of the line A according to the intensity of the signal field produced with the rocking motion of the valve rocker arm 13 at the time when the engine is rotated, is obtained from the detecting coil 2. The output of the detecting coil 2 is amplified by the AC amplifier 42. A sample-and-hold circuit which is constituted by the analog switch 43, capacitor 44 and operational amplifier 45 holds the output of the AC amplifier 42 according to the signal (as shown in (c) in FIG. 4) produced from the control circuit 41, that is, it holds each sampled value sampled at the time of appearance of each pulse of the amplifier output for a period until the appearance of the next pulse. In this way, a signal as shown in (d) in FIG. 4 is obtained. This output signal is converted through a pulse shaper circuit constituted by the Schmitt circuit 46 into a pulse signal as shown in (e) in FIG. 4, which appears at the output terminal 4b. This signal consists of a train of pulses each produced for two rotations of the engine, so that the engine rpm can be readily determined from this signal.

Figure 5:
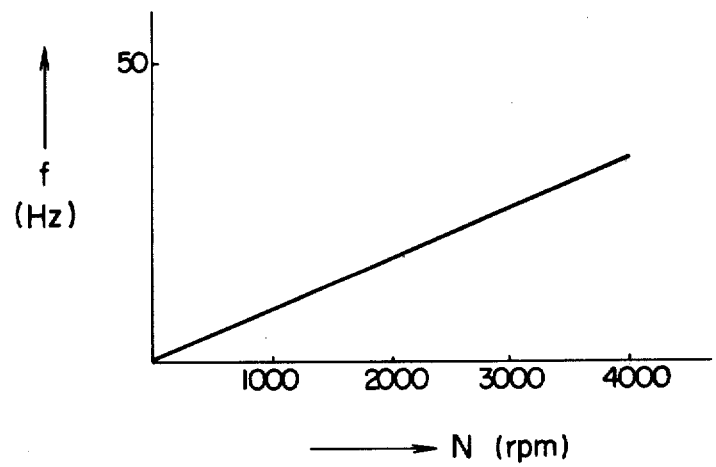
FIG. 5 is a graph showing an example of the characteristic of measurement of the embodiment of FIG. 2.

FIG. 5 shows measurement data obtained when the rpm of a diesel engine is measured with the above embodiment. In FIG. 5, the ordinate is the frequency f of the pulse output at the output terminal 4b, and the abscissa is the engine rpm N.

While the above embodiment is concerned with the diesel engine, it will be apparent that the invention is applicable to the gasoline engine as well. Also, where the valve operating member found in the neighborhood of the oil inlet is a cam or the like, it is possible to magnetize the cam or the like. Further, the magnetic sensor section 21 used in the above embodiment is by no means limitative, any other means capable of detecting the magnetic field changes such as a hall element or a magnetic reluctance element may be used as well by increasing the magnetization of the valve rocker arm 13.

We claim:

1. In an internal combustion engine having a cylinder head cover provided with an oil inlet and a valve drive mechanism disposed within said cylinder head cover, an rpm detection system for detecting the number of revolutions of the engine, comprising:
    a pre-magnetized valve operating member constituting a component element of said valve drive mechanism and located in the neighborhood of said oil inlet;
    a magnetic sensor removably mounted in said oil inlet for detecting the changes of the magnetic field in said magnetized valve operating member accompanying the motion thereof; and
    a processing circuit means for converting the detection signal from said magnetic sensor into a pulse signal having a frequency proportional to the engine rpm.

2. An internal combustion engine according to claim 1, wherein said magnetic sensor includes a housing, said processing circuit means being accommodated in said housing.

3. An internal combustion engine according to claim 2, wherein said magnetized valve operating member includes a valve rocker arm.

4. An internal combustion engine according to claim 1, wherein said magnetic sensor comprises a flux gate type magnetometer including an annular core, a drive coil uniformly wound on said core and a detecting coil wound on said drive core in X and Y directions, and wherein said processing circuit means includes a drive circuit having an oscillator circuit which oscillates at a constant frequency and a circuit for supplying a drive signal to said drive coil according to the output of said oscillator circuit and a detecting circuit for amplifying, sampling and shaping the output signal of said detecting coil to produce a pulse signal.

5. An rmp detection system for an internal combustion engine having a cylinder head cover provided with an oil inlet and a pre-magnetized valve rocker arm disposed within said cylinder head cover in the neighborhood of said oil inlet, said detection system comprising:
    magnetic sensor means for detecting the changes of the magnetic field of said valve rocker arm accompanying the motion thereof, said magnetic sensor means including a flux gate type magnetometer having an annular core, a drive coil uniformly wound on said core and a detecting coil wound on said drive coil in X and Y directions; and
    processing means for converting the magnetic field changes detected by said magnetic sensor means into a corresponding pulse signal, said processing means and said magnetic sensor means being made integrally with each other and being removably installed in said oil inlet.

6. An rpm detection system according to claim 5, wherein said processing means includes a drive circuit having an oscillator circuit which oscillates at a constant frequency and a circuit for supplying a drive signal to said drive coil according to the output of said oscillator circuit and a detecting circuit for amplifying, sampling and shaping the output signal of said detecting coil to produce a pulse signal.

7. An rpm detection system according to claim 6 or 4 wherein said internal combustion engine is a diesel engine.

8. An rpm detection system according to claim 6, wherein said drive circuit further includes an analog switch and a control circuit controlled by the output of said oscillator circuit, and wherein said detecting circuit effects the sampling and holding of said detecting coil output signal through said analog switch being driven by the output of said control circuit after the amplification of said detecting coil output signal.

* * * * *